United States Patent [19]
Ferrar

[11] 3,973,851
[45] Aug. 10, 1976

[54] DISPERSION COMPENSATED LASER GYRO (U)
[75] Inventor: Carl M. Ferrar, Rockville, Conn.
[73] Assignee: United Technologies Corporation, Hartford, Conn.
[22] Filed: Mar. 29, 1973
[21] Appl. No.: 347,581

[52] U.S. Cl. .................... 356/106 LR; 331/94.5 M; 332/7.51
[51] Int. Cl.² ........................ G01B 9/02; H01S 3/05
[58] Field of Search ................ 331/94.5 A, 94.5 M; 356/106 LR, 28, 152; 332/7.51; 350/151, 161

[56] References Cited
UNITED STATES PATENTS
3,392,622  7/1968  Seng ................................. 356/152
3,537,027  10/1970 Smith ........................... 356/106 LR
3,752,586  8/1973  Hutchings et al. ............... 332/7.51

OTHER PUBLICATIONS
Ferrar, "Controllable Phase Locked & Splitting in 2-0 Lasers," 7/71, pp. 373–374, IEEE, J.Q.E., QE-7, No. 7.
Hutchings et al, "Amplitude & Frequency Characteristics of a Ring Laser", 12/2/66, pp. 467–473, Physical Rev. vol. 152, No. 1.

Primary Examiner—Nelson Moskowitz
Attorney, Agent, or Firm—M. P. Williams

[57] ABSTRACT

An axial magnetic field applied to the laser gain medium of a laser gyro provides, through the Zeeman Effect, a pair of gain versus frequency profiles relating to respective counter-rotating waves (clockwise and counterclockwise) with their frequencies of maximum gain displaced from one another by an amount which is proportional to the applied magnetic field, and which is substantially equal to the frequency difference caused by an applied directional bias, such that the separation between the frequency of each wave and the frequency of maximum gain of the related gain profile is the same for both waves. This causes the counter-rotating waves to operate on points of equal phase (or index of refraction) on the corresponding dispersion characteristic curve associated with the related gain versus frequency profile. Under these conditions, even if the effective optical length of the gain medium changes in response, for example, to externally induced perturbations of the medium or of the resonant laser frequency, the change is essentially the same for each of the counter-rotating waves, and is thereby substantially cancelled when the wave frequencies are differenced to obtain a gyro output. For example, when cavity length drift causes increases or decreases in both frequencies, thereby causing the waves to intersect different portions of the related dispersion characteristic curve, which are typically not linear or stable, the pair of dispersion characteristics will have similar nonlinearity and instability, and errors resulting therefrom will be substantially cancelled.

2 Claims, 5 Drawing Figures

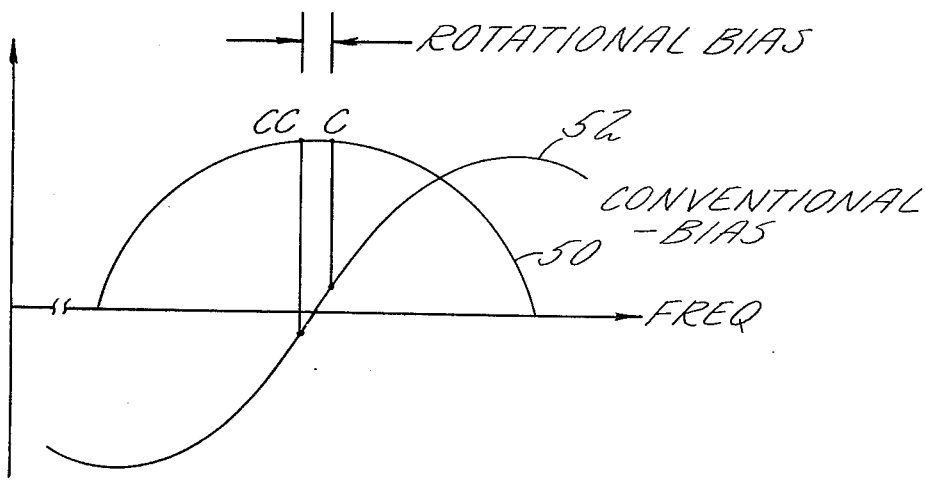
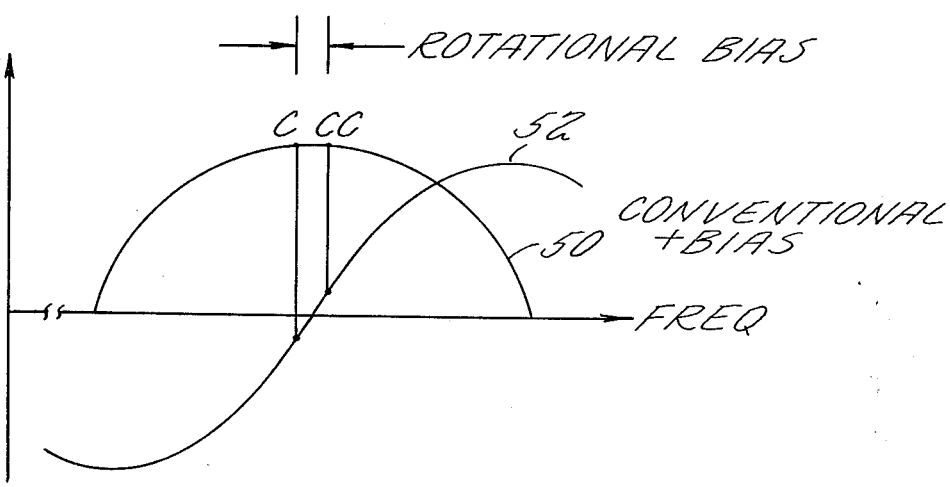
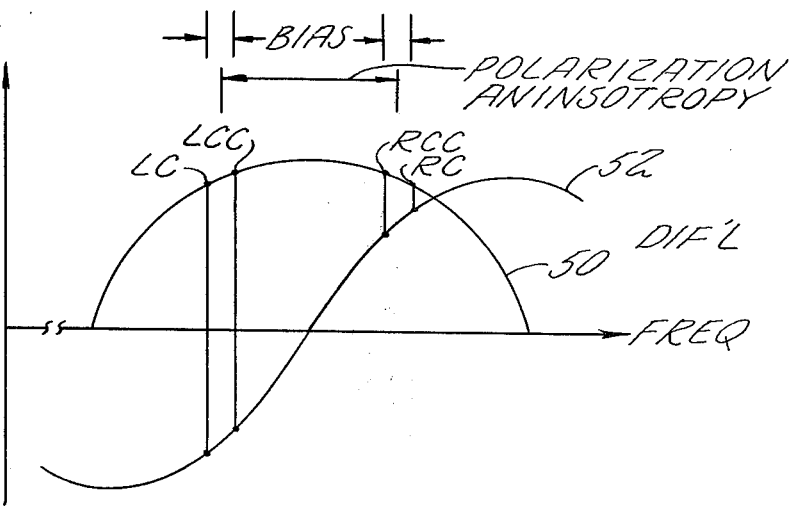

DISPERSION COMPENSATED LASER GYRO (U)

BACKGROUND OF THE INVENTION

1. Field of Invention

This invention relates to laser gyros, and more particularly to dispersion compensation therefor.

2. Description of the Prior Art

There are many forms of laser gyro known to the art. A typical laser gyro has waves of the same nominal frequency and polarization circulating in both the clockwise and counterclockwise directions, a rotation of the laser causing the wave traveling in the direction of rotation to assume a lower frequency than the wave traveling in the direction opposite to that of the rotation, whereby a difference in frequency of the two waves is an indication of the rotation being sensed. Since there is a tendency of the counter-rotating waves to lock together at the same frequency, when the rotation rate is small and the frequency differential is therefore small, it has been known to provide effective rotational bias to the laser, either in the form of mechanical bias or Faraday effect bias (a magnetic field operating on a transparent optical material, such as glass or quartz, in the laser cavity), of a sufficient magnitude such that the two waves are always operating at a frequency differential which is too great to permit frequency locking of the two waves. In some gyros, the polarity of the rotational bias is periodically reversed so that the bias is eliminated from the time-average gyro output.

C. In another form of laser gyro, the bias is eliminated from the output by having essentially two laser gyros operating in the same optical path, one with right circular (or elliptical) polarization, and the other with left circular (or elliptical) polarization, the bias being the same for opposite polarizations, whereby it is cancelled by differencing the outputs, without reversing bias. Such a gyro, referred to as a differential laser gyro, is disclosed in a commonly owned copending application to Yntema et al, Ser. No. 763,277, filed on Sept. 27, 1968, now U.S. Pat. No. 3,862,803 entitled DIFFERENTIAL LASER GYRO. The differential laser gyro has the advantage that bias switching asymmetries are obviated since only a single polarity of bias is utilized, and under ideal conditions any extraneous magnetic effect (such as the earth's magnetic field) operates equally on both polarizations, and is therefore substantially cancelled.

Other gyros may not use bias polarity reversal and cancellation, but rather simply rely on subtraction of the known nominal bias magnitude from the result obtained.

As is known, the gain versus frequency characteristic of the laser gain medium always has associated therewith an index of refraction, or dispersion characteristic, which provides a slightly different optical length through the laser gain medium for waves of different optical frequencies; e.g. for clockwise vs counterclockwise waves when they are biased to different frequencies as above. The effect is opposite in dependence upon the polarity of the bias (that is, whether the clockwise or counterclockwise wave is operating at a higher or lower frequency, and therefore at a higher or lower point on the dispersion characteristic). In gyros where bias is reversed for bias cancellation purposes, this difference in the optical length is cancelled along with the applied bias. However, in gyros which do not employ bias reversal, and in the differential laser gyro wherein bias cancellation is automatically effected by the combination of outputs from opposite polarizations, the variations which can occur in the effective optical length for the counter-rotating waves are not cancelled. These variations result from the fact that, due to minor shifts in the optical length of the total optical cavity of the laser gyro, the absolute frequency of both counter-rotating waves may increase together, or decrease together, and since the dispersion characteristic is nonlinear characteristic, this can cause the additional variation of optical length within the gain medium to vary as between the two waves, thereby providing the same effect as the change in the rotational rate of the gyro, which introduces significant errors in the rate sensed. Similar errors can also result from fluctuations or perturbations of the gain medium itself.

SUMMARY OF THE INVENTION

The principal object of the present invention is to provide dispersion compensation in laser gyros, without the need for applied bias polarity reversals.

According to the present invention, an axial magnetic field applied to a laser gain medium sustaining counter-rotating waves in a laser gyro provides, through the Zeeman Effect, a pair of gain versus frequency profiles with their frequencies of maximum gain displaced from one another by an amount which is proportional to the applied magnetic field and which is substantially equal to the frequency difference between counter-rotating waves caused by an applied directional bias, such that the separation between the frequency of each wave and the frequency of maximum gain of the related gain profile is the same for both waves. This causes the counter-rotating waves to operate on points of equal dispersion (or index of refraction) on the corresponding dispersion characteristic curves, which are associated with the related gain profiles for the counter-rotating waves. Therefore, changes in the effective optical length of the gain medium for the counter-rotating waves are substantially equal, and are cancelled.

By providing separate gain versus frequency profiles in which the frequency of maximum gain differs for counter-rotating waves, the present invention commensurately provides dispersion characteristics for waves operating at different frequencies (such as clockwise and counterclockwise waves which are provided with rotational bias, or such as waves of different polarization provided in a differential laser gyro employing a directional anisotropy such as magnetic birefringence), whereby related waves of different frequencies can each operate at corresponding points of frequency-shifted, but otherwise similar dispersion characteristics, so that minor perturbations in the frequencies of the waves do not introduce different changes in the effective optical length of the gain medium for the waves at different frequencies, but instead provide substantially the same optical length changes, which optical length changes are cancelled automatically, thereby eliminating one source of rotational rate sensing error in laser gyros. The present invention is equally applicable to differential laser gyros employing waves of opposite polarizations and to conventional laser gyros employing waves of but a single polarization.

The present invention provides substantial dispersion compensation as a result of extremely small magnetic fields applied parallel to the counter-rotating waves in the gain medium, which fields may typically be substantially smaller than one Guass.

Other objects, features and advantages of the present invention will become more apparent in the light of the following detailed description of a preferred embodiment thereof, as illustrated in the accompanying drawing.

BRIEF DESCRIPTION OF THE DRAWING

FIGS. 2 and 3 are illustrations of the gain and dispersion profiles of the laser gain medium of a typical laser gyro;

FIG. 4 is an illustration of the gain and dispersion characteristics of the laser gain medium of a differential laser gyro without the present invention.

DESCRIPTION OF THE PREFERRED EMBODIMENT

Figure 1:
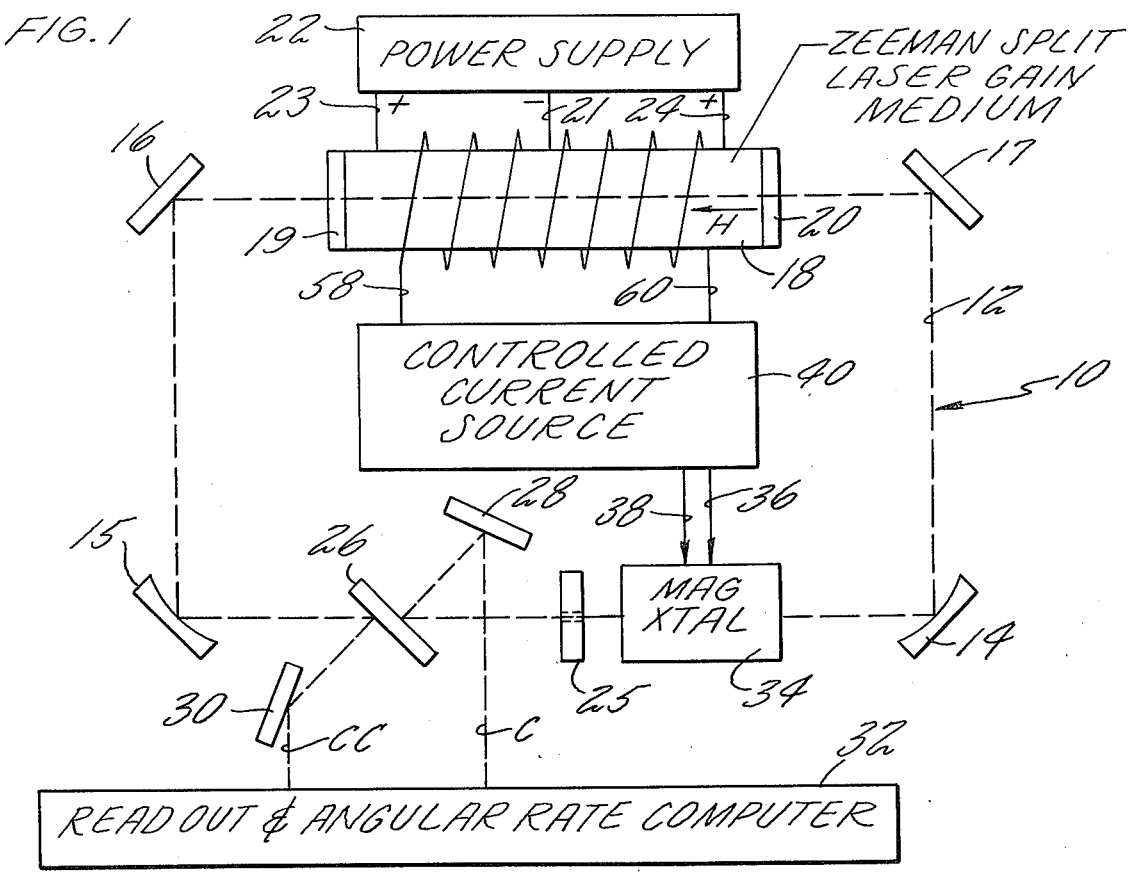
FIG. 1 is a simplified schematic illustration of a differential laser gyro employing the present invention.

Referring now to FIG. 1, a differential laser gyro employing the present invention comprises a closed loop laser cavity 10 in which a laser beam or wave 12 is reflected by a plurality of mirrors 14–17. The mirrors 14, 15 may preferably be slightly concave so as to minimize diffraction losses about the cavity 10. In a four mirror cavity, two mirrors, rather than one, are preferably curved for symmetry in order to offset minor differences in effect which an odd number of curved mirrors could have on oppositely travelling electromagnetic waves. The two other mirrors 16, 17 may preferably be flat, although they also could be slightly curved. A laser gain medium may be provided in a suitable closed chamber 18 which may preferably be closed off by anti-reflection coated windows 19, 20 at near normal incidence (to minimize extraneous polarization anisotropy). Alternatively, the entire laser cavity may comprise a closed chamber, eliminating the need for windows.

The laser gain medium may preferably comprise helium and neon, the neon may preferably be an equal mixture of neon-20 and neon-22. A mixture of 18 parts of helium to one part each of the two isotopes of neon is found to be satisfactory, as are other mixtures in accordance with the individual desired characteristics of any given implementation of the present invention. Alternatively, other known laser gain media may be employed.

The laser gain medium may be excited by DC fields created between a cathode (not shown) which is supplied negative voltage over a line 21 from a DC power supply 22, and a pair of anodes (not shown) which are supplied a positive voltage over respective lines 23, 24 from the power supply 22. The opposite orientation of the anodes is utilized to minimize the effects of Langmuir flow, as is well known in the art; alternatively, RF excitation may be utilized, as is known, if desired.

One or more apertures 25 may be used in the laser cavity to ensure oscillation in a single transverse mode of the cavity. Size and placement of such apertures may be determined empirically so as to optimize oscillation strength and minimize non-reciprocal effects on the oppositely travelling waves.

As is known, the laser cavity 10 will support electromagnetic waves propagating in both the clockwise and counterclockwise directions, and rotation of the cavity 10 (together with the remainder of the hardware 14–20, and additional hardware physically related to the cavity 10) causes an increase in frequency of the wave travelling oppositely to the rotation and a decrease in frequency of the wave travelling in the same direction as the rotation. It is this difference of frequency which allows measurement of angular rates with lasers. Laser energy is extracted from the cavity 10 by a pickoff window 26 which may simply comprise an optically transmitting element with at least one surface coated for slight reflection at the laser wavelength, and slightly tilted to deflect the desired output energy. Slight lensing of window 26 may be employed as an alternative, or in addition, to the previously noted mirror curvature, for reduction of diffraction losses. The function of the window may be served by any transmission element in the optical path; e.g. by a quartz crystal described hereinafter.

The clockwise waves are reflected by a mirror 28 and the counterclockwise waves are reflected by a mirror 30 so as to provide these waves to a read out and angular rate computer 32, which is described more fully hereinafter.

The present embodiment, like the aforementioned differential laser gyro, utilizes, in a sense, two completely separate laser gyros operating in the same laser cavity. This is achieved by providing a polarization anisotropy, such as may be achieved by introducing suitable birefringence into the optical cavity. In the present case (as in the aforementioned copending application) the birefringence (optical activity in this case) may be provided by a quartz crystal 34 having its optic axis parallel to the beam path. In the present embodiment, (as in the aforementioned copending application) effective rotational bias may be provided by the application of a magnetic field to the quartz crystal 34 which creates the well known magnetic bias through the Faraday effect. The magnetic field in the crystal 34 is established in a suitable fashion, such as by a solenoid-wound electrical coil (not shown), which is energized by current applied on a pair of respective lines 36, 38 from a suitable source, such as a controlled current source 40. Since the quartz crystal 34 exhibits the Faraday effect in a magnetic field (thereby to provide the desired magnetic bias) only to waves of circular or elliptic polarization, the laser gyro of the present embodiment is operated with circular or elliptical polarization, rather than plane polarization.

The read out and annular rate computer 32 receives the clockwise waves from the mirror 28 and the counterclockwise waves from the mirror 30, and combines these waves, in any suitable fashion, so as to provide clockwise and counterclockwise waves of one polarization to one detector, and clockwise and counterclockwise waves of the other polarization to another detector. Each of the detectors has the characteristic that it will provide output signals equal to the difference in frequency between the two waves applied thereto, so that each detector provides a measure of the difference between the clockwise and counterclockwise waves of the related polarization. This may be achieved by passing the waves from the mirrors 28, 30 through quarterwave plates so as to cause them to be linearly polarized, then mixing the waves and separating them with analyzers, the output of each analyzer feeding the respective detector. The detector outputs may each feed a frequency meter which simply determines the frequency of the detector outputs by a timed count of the signals supplied by the detectors. The frequency reading of one polarization can be subtracted from that of the other polarization, thereby providing a signal which is an indication of twice the angular rate, with all the bias cancelled. This is the manner of operation of the aforementioned differential laser gyro. In this mode of operation, the bias is cancelled since it operates equally on both polarizations. However, the aforementioned errors resulting from the two waves operating at different frequencies, and therefore at different points on the dispersion curve of the gain medium 18 result in minor variations in optical length which are different for the waves of different frequency, and which thereby provide frequency differences between the waves of opposite polarizations which appear the same as frequency differences resulting from an angular rotational rate. Therefore, these differences are not cancelled in the rate computing means 32. This phenomenon is perhaps better understood with reference to FIGS. 2–4. In FIG. 2 is shown a stylized illustration of the gain versus frequency profile 50 of the laser gain medium, and the associated dispersion (or phase) characteristic 52, in a conventional laser gyro employing rotational bias. In FIG. 2 it is assumed that the bias is negative, thereby causing a difference in frequency between the clockwise (C) and counterclockwise (CC) waves which is the same as a counterclockwise rotation, causing the clockwise wave to have a higher frequency and the counterclockwise wave to have a lower frequency. Because of the difference in frequency, each of the clockwise and counterclockwise waves are at different points on the phase versus frequency profile 52, which means that the effect of optical length of the laser gain medium itself is different for the two waves; but more importantly, if the frequencies of the two waves change because of minor drifting in the optical length of the cavity, both the clockwise and the counterclockwise waves will shift on the phase versus frequency profile 52, so that the difference between their effective optical lengths may not remain the same (due to non-linearity of the dispersion curve). In addition, the relative gains for the two waves may change. It is common in conventional laser gyros to reverse the bias on a cyclic basis, which would achieve the result illustrated in FIG. 3. With positive bias, which is assumed to be such as to cause frequency shifting of the clockwise and counterclockwise waves in the same fashion as a clockwise rotation, the counterclockwise wave is at the higher frequency and the clockwise wave is at the lower frequency. If there is any shifting of frequency with positive bias, the changes in the differential optical length between the clockwise and counterclockwise waves within the laser gain medium will be the same as those seen with the negative bias illustrated in FIG. 2. Therefore, when the frequency difference derived with minus bias is subtracted from that derived with positive bias, so that the bias cancels out, so too will the differences in effective optical length of the waves in the laser gain medium.

However, in the differential laser gyro, as is illustrated in FIG. 4, the bias effects are different for waves of right circular polarization and left circular polarization. Thus the right circular polarized clockwise wave (RC) is higher in frequency than the right circular polarized counterclockwise wave (RCC), and the left circular polarized counterclockwise wave (LCC) is higher in frequency than the left circular polarized clockwise wave (LC). Consider for a moment a counterclockwise rotation of the differential laser gyro. As is known, this causes the clockwise wave to have a higher frequency and the counterclockwise wave to have a lower frequency, without regard to bias or polarization. Thus the right circular polarized waves would have a greater frequency differential between them but the left circular polarized waves would have a smaller frequency differential between them, with the negative bias used for illustration in FIG. 4. By subtracting one from the other, there is derived a result which is equal to twice the angular rate with the bias cancelled. Thus there is no need to reverse bias to eliminate it from the gyro output. Any change in the optical length of the optical cavity may cause all four waves to increase or decrease in frequency, thereby causing them to intersect different portions of the dispersion curve 52, which, since it is not linear, will cause variation of the differences in the effective optical length within the gain medium. Thus, a tendency for a minor increase in frequency due to a shortening of the optical length of the cavity will move the right circular polarized waves to a position of smaller slope on the dispersion curve, thereby decreasing the mode pulling effect in a given direction, whereas the left circular polarized waves will be at a position of steeper slope, thereby increasing an opposite mode pulling effect, so that the differences in the effects create rate rotation sensing errors which are not cancelled.

It is the changes in relative cavity length between the clockwise and counterclockwise waves that result in the errors, rather than the absolute difference of cavity length. Thus, if the cavity were absolutely stable, or if the dispersion curve were perfectly stable and perfectly linear, the difference in optical length for the various waves would be immaterial since they could be subtracted as fixed calibration errors. However, perturbations of the system resulting in a change in the relative phase characteristic between the two pairs of clockwise and counterclockwise waves do not cancel. However, FIG. 4 illustrates that the frequency spread between the opposite polarizations (due to the anisotropy) cause these waves to oscillate at points which are far removed from the zero point of the dispersion curve and are therefore in a highly non-linear region. Thus, the differential laser gyro suffers from significant dispersion-caused errors.

Figure 5:
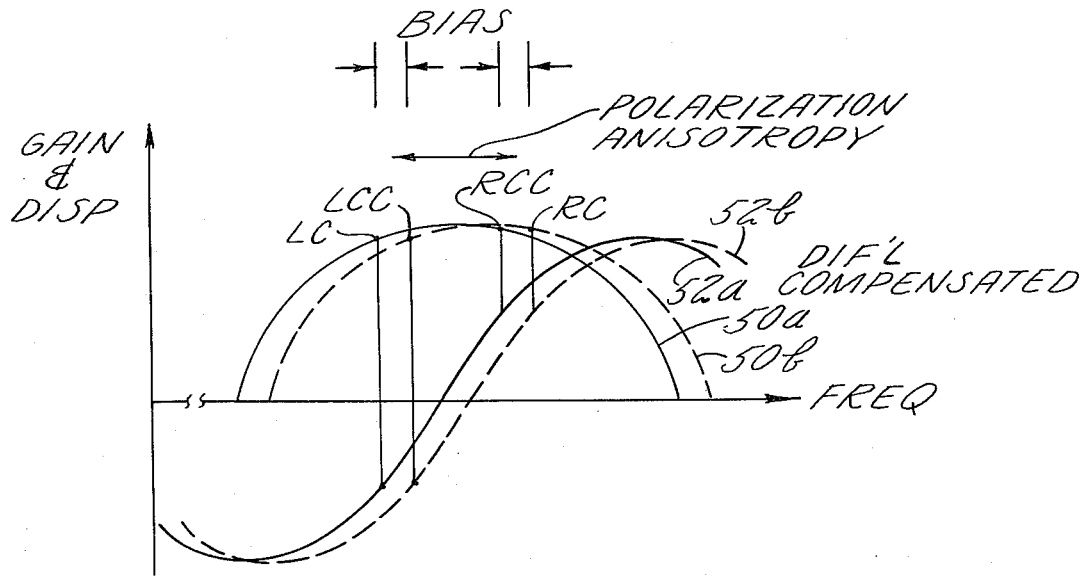
FIG. 5 is an illustration of the gain and dispersion profile of the laser gain medium of a differential laser gyro employing the present invention.

The aforementioned difficulties are overcome, in accordance with the present invention, in a manner which is illustrated in FIG. 5. Therein, Zeeman splitting causes two different gain profiles 50a, 50b which respectively correspond to waves of various combinations of rotational direction and right-handedness or left-handedness of circular or elliptical polarization. This is due to the fact, as is well known, that the Zeeman Effect is dependent upon the direction in which the wave proceeds through a parallel magnetic field, as compared with the direction of the field, as well as to the right-handedness or left-handedness of polarization of the circular or elliptically polarized wave. Thus, the right circular polarized counterclockwise wave and left circular polarized clockwise wave see the gain profile 50a having the lower frequency of maximum gain characteristic, and the right circular polarized clockwise wave and left circular polarized counterclockwise wave see the gain profile 50b having the higher frequency of maximum gain. With the Zeeman Effect adjusted so that the difference in maximum gain frequency of the two profiles 50a, 50b, and therefore the difference in frequency between the zero point of the dispersion profiles 52a, 52b are equal to the frequency difference created by the magnetic bias, both of the right circular polarized waves will be at substantially the same dispersion point on the similar, but frequency-shifted dispersion curves 52a, 52b, and both of the left circular polarized waves will similarly be at substantially the same dispersion point on the curves 52a, 52b. Note that if the axial magnetic field direction is reversed, without reversing the direction of bias, then the effect will be opposite: that is, the right circular polarized clockwise wave would see the gain profile 50a and the right circular polarized, counterclockwise wave would see the gain profile 50b, whereby there would be a significant difference between the dispersion points of the two counter-rotating waves on the dispersion curves 52a, 52b. Similarly, if the Zeeman Effect is not controlled to provide substantially the same frequency difference between the points of maximum gain on the gain characteristics 50a, 50b as the frequency difference provided by the bias between the counter-rotating waves, then the counter-rotating waves will not be operating on similar points of the related curves.

In accordance with the invention, the Zeeman Effect is provided in the laser gain medium 18 (FIG. 1) simply by inducing a suitable axial magnetic field (one that is parallel to the direction in which waves travel through the gain medium 18), by any suitable means. For instance, a solenoid-wound coil 56, provided with a current over a pair of lines 58, 60 from the controlled current source 40, may be utilized to provide the desired magnetic field for a correct Zeeman Effect. Since the current applied to the magnetic crystal 34 determines the frequency split of the directional bias, and the current applied to the solenoid 56 determines the magnetic field of the Zeeman Effect, and is preferable that the two currents be related in some fashion so as not to provide random variations in the frequencies related thereto as a result of random variations (such as temperature) in the related current sources. Therefore, it may in some cases be preferable to drive both magnetic fields from the same current source 40.

It should be noted that the present invention has been described with respect to conditions which obtain in the laser cavity without any rotation being sensed. However, since rotation induces a change in frequency in all of the waves circulating therein, which frequency change will necessarily alter the points at which the various waves intersect the related dispersion curves, the dispersion compensation in accordance with the present invention deteriorates with increasing rotational rates. However, since the greatest accuracy is desired at the lowest rotational rates, the present invention provides a significant temperature in the accuracy with which differential laser gyros may provide rotational rate sensing.

The manner of relating to two currents in the magnetic crystal 34 and in the Zeeman Effect coil 56 is known in the art. The rotational bias provided by the magnetic crystal 34 is established in any case to be in excess of the maximum annular rate which is desired to be sensed by the related gyro. This can be calculated, as can the frequency shift between counter-rotating waves resulting from the directional bias introduced by the magnetic crystal 34. Once this frequency shift is known, it is a simple matter to calculate the magnetic field required for an equivalent frequency shift in the gain and dispersion profiles within the laser gain medium, utilizing only techniques which are known to the art. However, if desired, this may all be achieved by empirical adjustment of any given gyro employing the present invention.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. A laser gyro comprising:
   a closed loop optical cavity including a plurality of mirrors defining an optical path;
   a laser gain medium disposed in said optical path, said laser gain medium having a gain versus frequency profile and a related dispersion profile having its zero point substantially at the frequency of maximum gain of the frequency versus gain profile with which it is associated;
   a directional bias means disposed in the optical path of said optical cavity for providing a directional bias resulting in a frequency difference between waves circulating in one direction in said optical cavity and waves circulating in the other direction in said optical cavity, said bias being equivalent to at least the largest angular rate to be sensed by said laser gyro;
   Zeeman Effect means providing a magnetic field within said laser gain medium oriented parallel to the waves circulating through said laser gain medium, said Zeeman Effect means providing two distinct gain versus frequency profiles in said laser gain medium, with two distinct corresponding dispersion profiles, said magnetic field having a magnitude to cause a frequency difference between the frequency of maximum gain of said two gain versus frequency profiles which is equal to the frequency difference between counter-rotating waves caused by said directional anisotropy means, the magnetic field of said Zeeman Effect means being related to the polarity of said directional anisotropy means so as to cause counter-rotating waves supported by each of said gain versus frequency profiles to be at substantially equal dispersion points on the related dispersion profiles;
   means for extracting the clockwise and counterclockwise waves from said cavity and for providing an output manifestation of angular rate of said laser gyro as a function of frequency difference between said clockwise and counterclockwise waves.

2. A laser gyro according to claim 1, further comprising:
   a polarization anisotropy disposed in said optical path, wherein said optical cavity sustains laser oscillations in two different substantially mutually opposite polarizations at different frequencies, the difference in frequency between said mutually opposite polarizations being significantly greater than the frequency difference between counter-rotating waves created by said directional bias means, whereby the counter-rotating waves of one of said polarizations supported by each of said gain versus frequency profiles are at substantially equal dispersion points on the related dispersion profiles, and the counter-rotating waves of the other of said polarizations supported by each of said gain versus frequency profiles are at substantially equal dispersion points on the related dispersion profiles, the waves of one polarization being at different dispersion points on the related dispersion profiles than the waves of the other of said polarizations.

* * * * *